United States Patent [19]

Lippa

[11] Patent Number: 5,450,974

[45] Date of Patent: Sep. 19, 1995

[54] MOUNTING PLATE AND COVER ASSEMBLY FOR AN ELECTRICAL OUTLET BOX

[76] Inventor: Jerome M. Lippa, 2131 High Point Rd., Forest Hill, Md. 21050

[21] Appl. No.: 306,172

[22] Filed: Sep. 14, 1994

[51] Int. Cl.$^6$ .............................................. F16M 13/00
[52] U.S. Cl. ........................................ 220/3.9; 220/3.8
[58] Field of Search ................ 220/3.8, 3.9, 3.4, 3.5

[56] References Cited

U.S. PATENT DOCUMENTS

| 1,133,946 | 3/1915 | Farrell | 220/3.4 |
| 1,206,431 | 11/1916 | Graybill | 220/3.4 |
| 2,218,731 | 10/1940 | Tuck et al. | 220/3.4 X |
| 3,260,400 | 7/1966 | Miles | 220/3.4 |
| 3,424,332 | 1/1969 | Pimentel | 220/3.6 |
| 3,724,795 | 4/1973 | Callanan | 220/3.9 X |
| 4,140,293 | 2/1979 | Hansen | 248/217.2 |
| 4,194,644 | 3/1980 | Narvaez | 220/3.3 |
| 4,399,922 | 8/1983 | Horsley | 220/3.6 |
| 4,533,060 | 8/1985 | Medlin | 220/3.9 |
| 4,569,458 | 2/1986 | Horsley | 220/3.6 |
| 4,603,789 | 8/1986 | Medlin, Sr. | 220/3.9 |
| 4,732,356 | 3/1988 | Medlin, Sr. | 248/27.1 |
| 4,753,361 | 6/1988 | Medlin, Jr. | 220/3.6 |
| 4,757,908 | 7/1988 | Medlin, Sr. | 220/3.9 |
| 4,844,275 | 7/1989 | Schnell et al. | 220/3.9 |
| 5,025,944 | 6/1991 | Rodick | 220/3.9 |
| 5,098,046 | 3/1992 | Webb | 248/27.1 |
| 5,289,934 | 3/1994 | Smith et al. | 220/3.9 X |

Primary Examiner—Steven M. Pollard
Attorney, Agent, or Firm—Leonard Bloom

[57] ABSTRACT

A rigid and unitary mounting plate and box support assembly for an electrical outlet box. The plate is fastened to the outlet box and secured to the front face of a stud in a wall such that the electrical outlet box solidly abuts the side wall of the stud. Movement in any direction of the assembly and the electrical outlet box is prevented.

7 Claims, 10 Drawing Sheets

MOUNTING PLATE AND COVER ASSEMBLY FOR AN ELECTRICAL OUTLET BOX

FIELD OF THE INVENTION

The present invention relates to an apparatus and a method for mounting an electrical outlet box on a stud and, more particularly to an apparatus for mounting the electrical outlet box abutting a wood or metal stud in a wall such that the electrical outlet box is prevented from moving in any direction.

BACKGROUND ART

In the course of constructing or rehabilitating a building, there is a need to mount many electrical outlet boxes in the wall to provide a safe means for housing electrical fixtures such as electrical switches, convenience outlets, electrical terminals, etc. The electrical outlet boxes are commonly four (4) inch square boxes or four and eleven sixteenths (4 11/16) inch boxes which may be ganged. The electrical outlet box may be supported by a variety of methods. U.S. Pat. No. 3,424,332 to Pimentel discloses a collar with mounting clips to secure the box support plate and outlet box to the wall. U.S. Pat. No. 4,140,293 to Hansen discloses a clamp with barbs to attach the outlet box to a sidewall of a wooden stud. In U.S. Pat. No. 4,194,644, Narvaez discloses an outlet box nailed to the sidewall of a stud. U.S. Pat. No. 4,533,060 to Medlin discloses an outlet box attached to an L-shaped bracket which engages, and is secured to, the side surface of the stud. The outlet box is spaced apart from the stud. Medlin, Sr. in U.S. Pat. Nos. 4,603,789, 4,732,356 and 4,757,908 discloses variations on mounting an outlet box. In most of the mountings, the outlet box is spaced apart from the stud. Also, a stiffening arm or far side box support formed on the L-shaped box support bracket, extends between the outlet box and the rear wall to stabilize the mounting. U.S. Pat. Nos. 4,399,922 and 4,569,458 to Horsley also disclose a mounting bracket spaced from the stud with a right angle extension stabilizer. U.S. Pat. No. 4,753,361 to Medlin, Jr. discloses an L-shape or T-shape bracket to which the outlet box is connected. A stiffening arm extends to the rear wall. The outlet box is spaced apart from the stud. U.S. Pat. No. 4,844,275 to Schnell et al disclose a molded, one-piece outlet box with attached flanges and ears for connection to a stud. U.S. Pat. No. 5,098,046 to Webb discloses the outlet box connected to a bracket to mount the outlet box apart from the stud. A stabilizing arm is formed on the bracket to extend to the rear wall.

In most of the references, the outlet box is not firmly secured to the stud and requires an auxiliary member such as the stiffening arm to attempt to reduce undesired deflection of the outlet box. Also, in most references, in order to mount the outlet box, the worker requires three components, an outlet box, a separate box support and a raised cover ring. The components must be assembled and connected in sequence which is labor intensive.

There is a need for a simplified outlet box mounting means which is immovable, reduces the number of components and can be assembled and mounted in less time than can be done with known technology to effect cost savings in parts and man-hours.

SUMMARY OF THE INVENTION

It is an object of the present invention to provide a means to securely mount an electrical outlet box on a stud so that movement of the outlet box in any direction is prevented.

It is a further object of the present invention to provide a means to securely mount an electrical outlet box to a stud wherein the number of components is reduced and the installation labor time is reduced, thereby being more cost effective than the known art.

In accordance with the teachings of the present invention, there is disclosed an electrical outlet box mounted on a stud between a front wall and a rear wall of a building structure. The stud has a side wall and further has a front face covered by the front wall of the building structure. The electrical outlet box normally has a separate box support and a raised cover ring secured thereto. The separate box support is ultimately secured to the stud such that the electrical outlet box is spaced from the side wall of the stud, thereby causing undesired deflection of the electrical outlet box between the front wall and the rear wall. The present invention has a single unitary member serving the dual function of the raised cover ring and the box support. Means are provided for securing the single unitary member to the electrical outlet box. The single unitary member includes a flange extending laterally therefrom and disposed over the front face of the stud. Means are provided for securing the flange to the front face of the stud, such that the electrical outlet box abuts solidly against the side wall of the stud and is prevented from undesired deflection, and further such that the necessity for a far side box support between the electrical outlet box and the rear wall of the building structure is completely obviated.

Also disclosed is a method of mounting an electrical outlet box on a stud in a wall.

These and other objects of the present invention will become apparent from a reading of the following specification, taken in conjunction with the enclosed drawings.

DESCRIPTION OF THE PREFERRED EMBODIMENTS

Referring now to FIGS. 1–7, the prior art is directed to an electrical outlet box 10 connected to a box support bracket 11 and the bracket connected to a stud 12. Various types of brackets 11 are known and with these brackets, the electrical outlet box 10 is spaced apart from the stud 12. In order to provide increased support for the electrical outlet box 10 in a typical industrial use, the bracket 11 is formed in an L-shape with the base 13 of the L being connected to the side wall of stud 12 and the leg 14 of the L being adjacent to the front face of the stud 12 (FIG. 1 and 2, corresponding to FIGS. 10 and 11 of U.S. Pat. No. 4,533,060). As further shown in FIG. 2, the bracket 11 is not supported distally from the stud 12 and can be deflected. In order to overcome this deflection, in another embodiment for residential use, the L-shaped bracket 11 is oriented with the top of the leg 14 of the L being connected to the front face of the stud 12 and the base 13 of the L being disposed between the front wall 15 and the back wall 16 of the installation. (FIGS. 3–4, corresponding to FIGS. 9 and 10 of U.S. Pat. No. 4,753,361) In this manner, the base 13 of the leg serves as a far side box support to prevent deflection of the bracket 11, and the connected electrical outlet box 10, between the front wall 15 and the back wall 16. However, the far side box support 13 may be too short to fully extend to the back wall 16 and an extension plate 17 is disclosed (FIG. 5, corresponding to FIG. 11 of U.S. Pat. No. 4,732,356) to be added to the far side box support 13. Another embodiment is to provide a very long far side box support 13 which is bent to a length equal to the space between the front wall 15 and back wall 16 (FIG. 6 corresponding to FIG. 13 of U.S. Pat. No. 4,732,356). The latter embodiment also provides a more secure base for the far side box support and eliminates the potential problem of the far side box support damaging the back wall.

Figure 1:
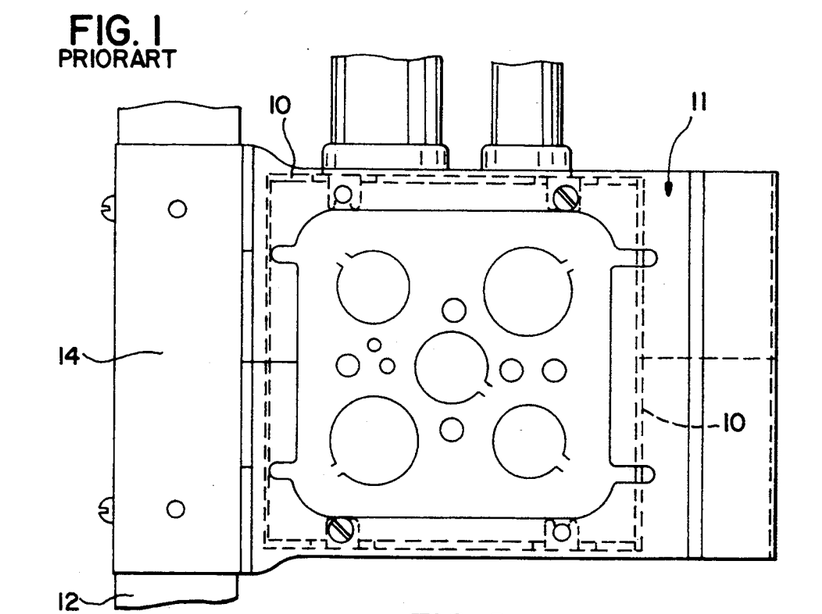
FIG. 1 is a front elevation view of the prior art showing an industrial use with a bracket mounted on an electrical outlet box.
Figure 2:
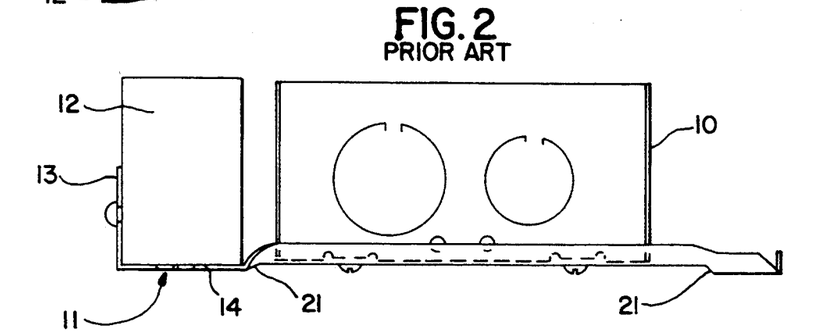
FIG. 2 is a top plan view of the bracket and electrical outlet box of FIG. 1 showing the L-shaped bracket on the side and front of the stud and the electrical outlet box spaced apart from the stud.
Figures 3, 4:
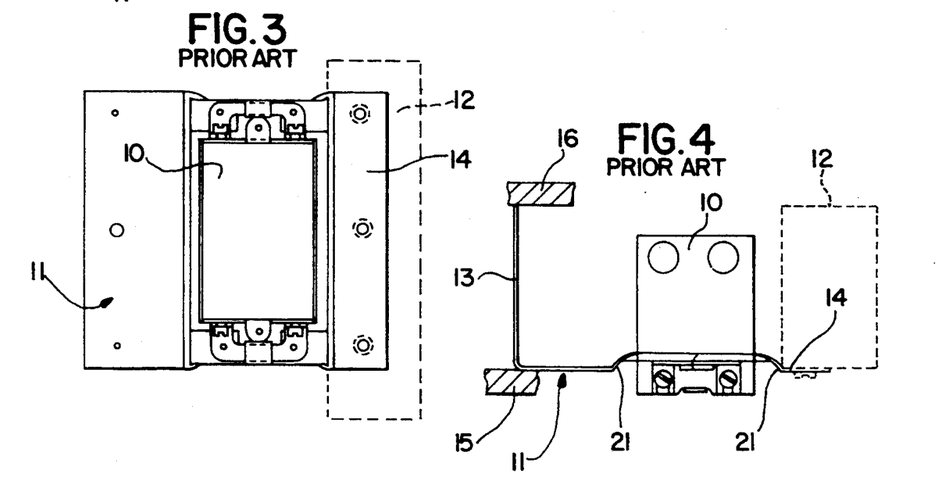
FIG. 3 is a front elevation view of another embodiment of the prior art showing a residential use with an electrical outlet box connected to a bracket and the bracket mounted on a stud.
FIG. 4 is a top plan view of the bracket and electrical outlet box of FIG. 3 and further showing a far side box support between the front wall and the rear wall.
Figure 5:
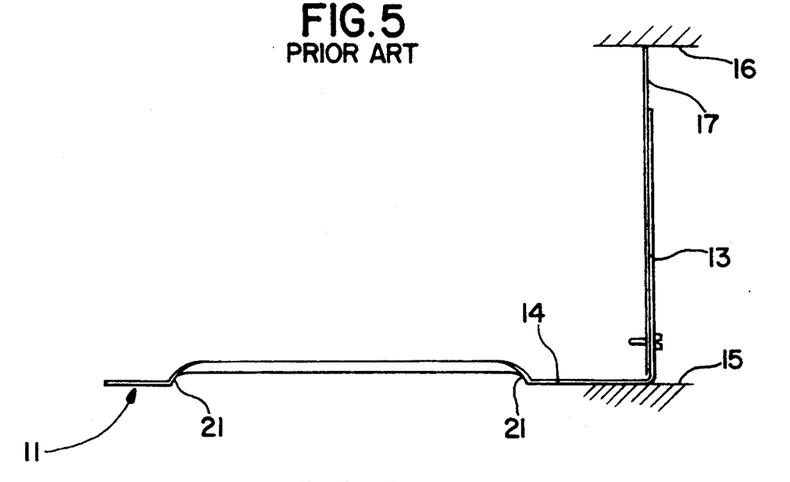
FIG. 5 is a top plan view of a prior art bracket showing an extension plate attached to the far side box support to extend the far side box support between the front wall and the back wall.
Figure 6:
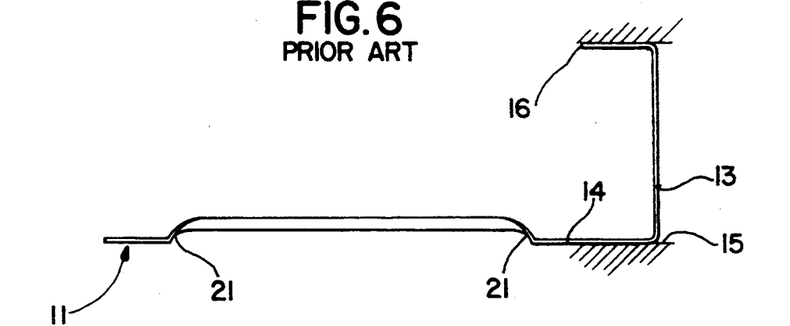
FIG. 6 is a top plan view of a prior art bracket showing the far side box support bent to provide support between the front wall and the hack wall.
Figure 7:
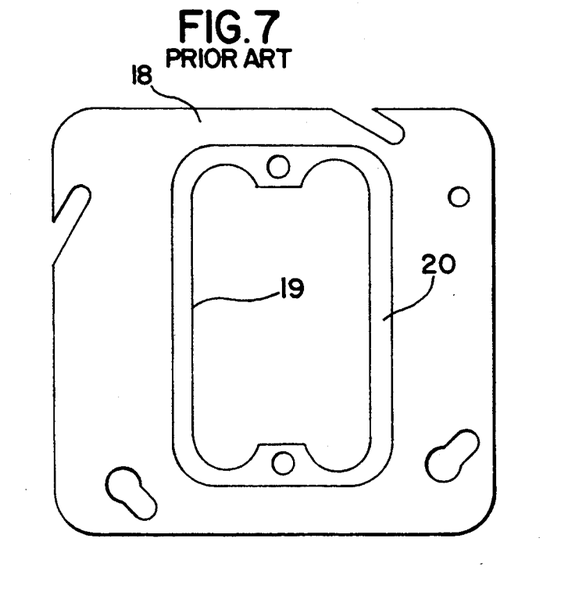
FIG. 7 is a front elevational view of a raised cover ring of the prior art which is disposed over the bracket.
Figure 8:
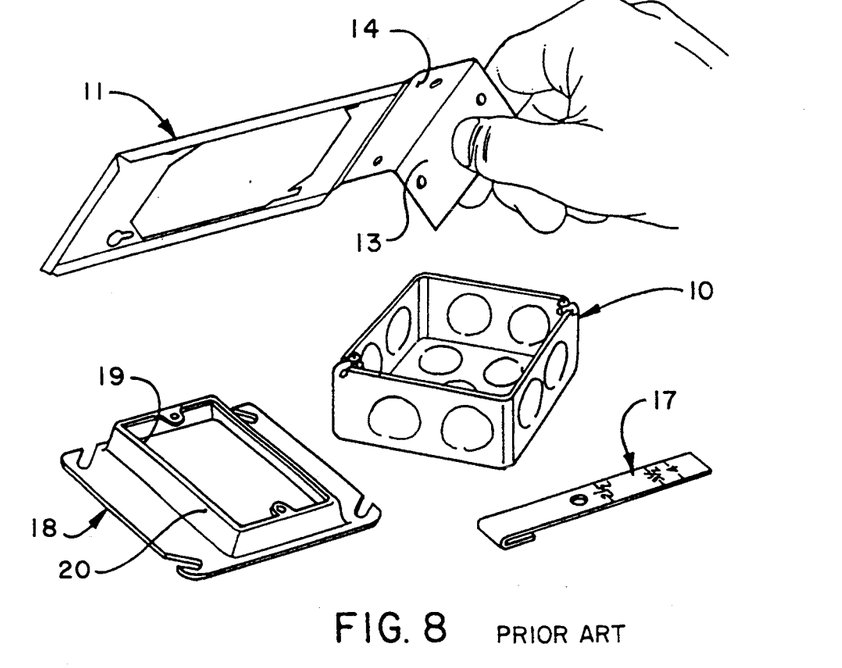
FIG. 8 is a pictorial view of a worker gathering the components of the prior art to mount the electric outlet box in a wall.
Figure 9:
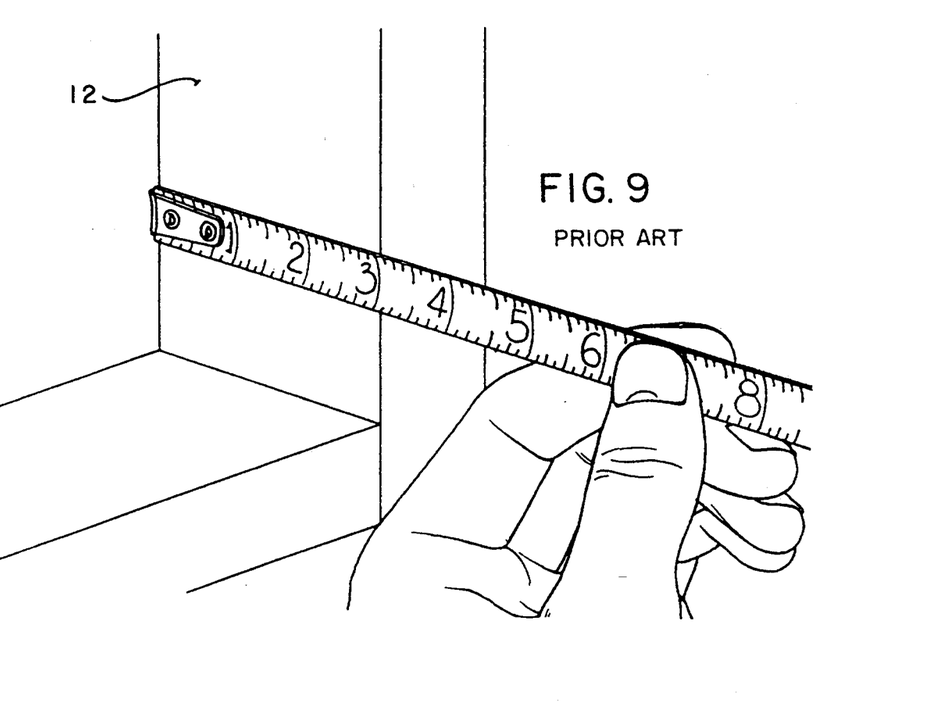
FIG. 9 is a pictorial view of the worker of FIG. 8 measuring the distance between the front wall and the back wall to determine the length of the far side box support.
Figure 10:
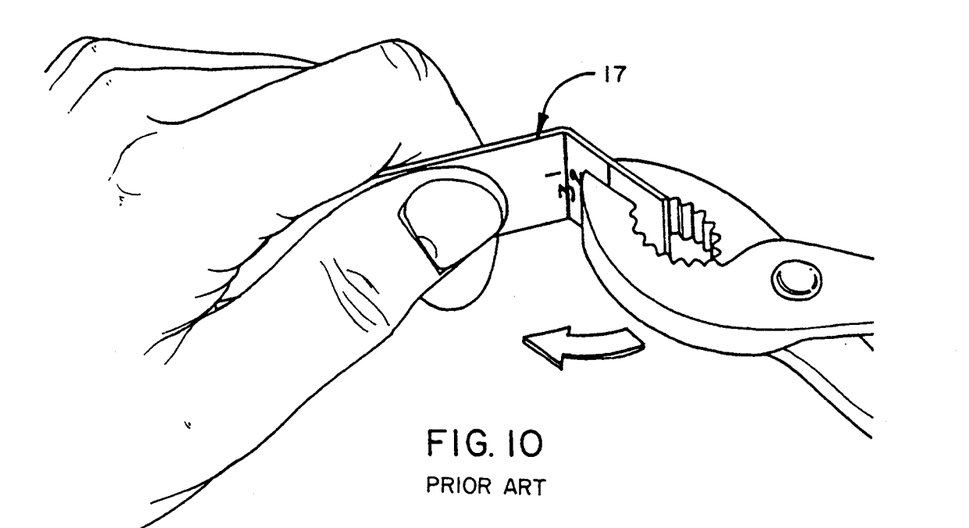
FIG. 10 is a pictorial view of the worker of FIG. 8 bending the far side box support.
Figure 11:
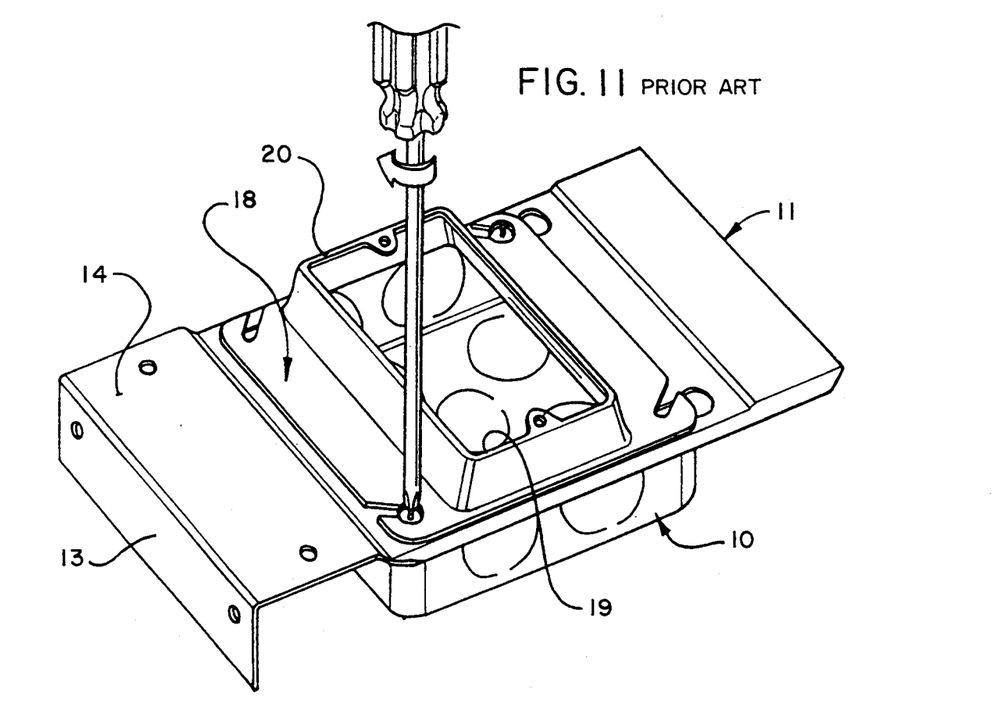
FIG. 11 is a pictorial view of the worker of FIG. 8 assembling the electrical outlet box, the box support and the raised cover ring.
Figure 12:
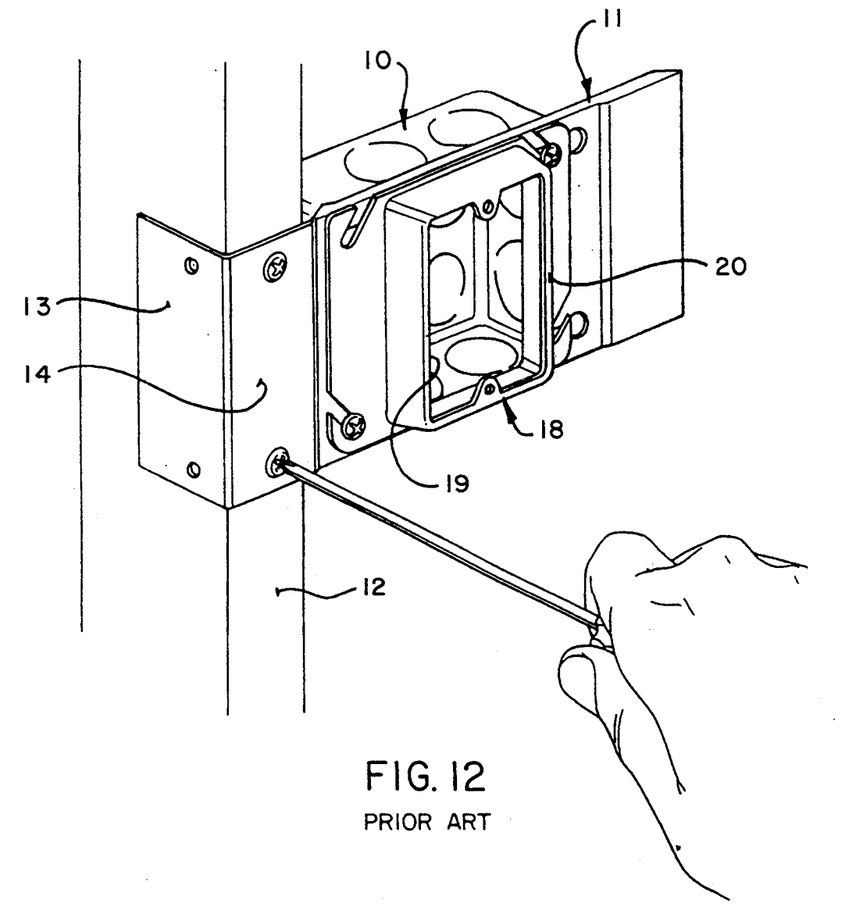
FIG. 12 is a pictorial view of the worker of FIG. 8 mounting the assembly in the wall.
Figure 13:
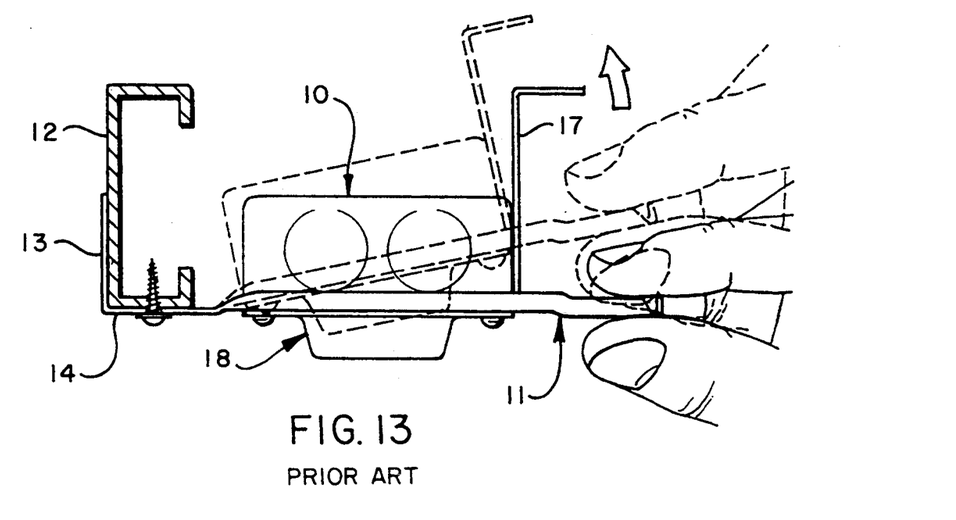
FIG. 13 is a top plan view of the prior art assembly showing deflection of the assembly.
Figure 14:
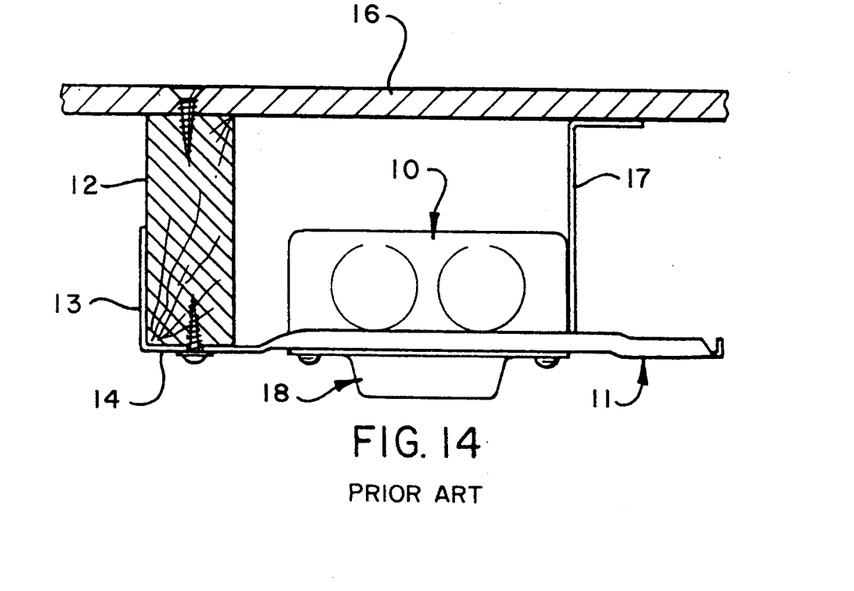
FIG. 14 is a top plan view of the prior art assembly showing the far side box support supported against the back wall.
Figure 15:
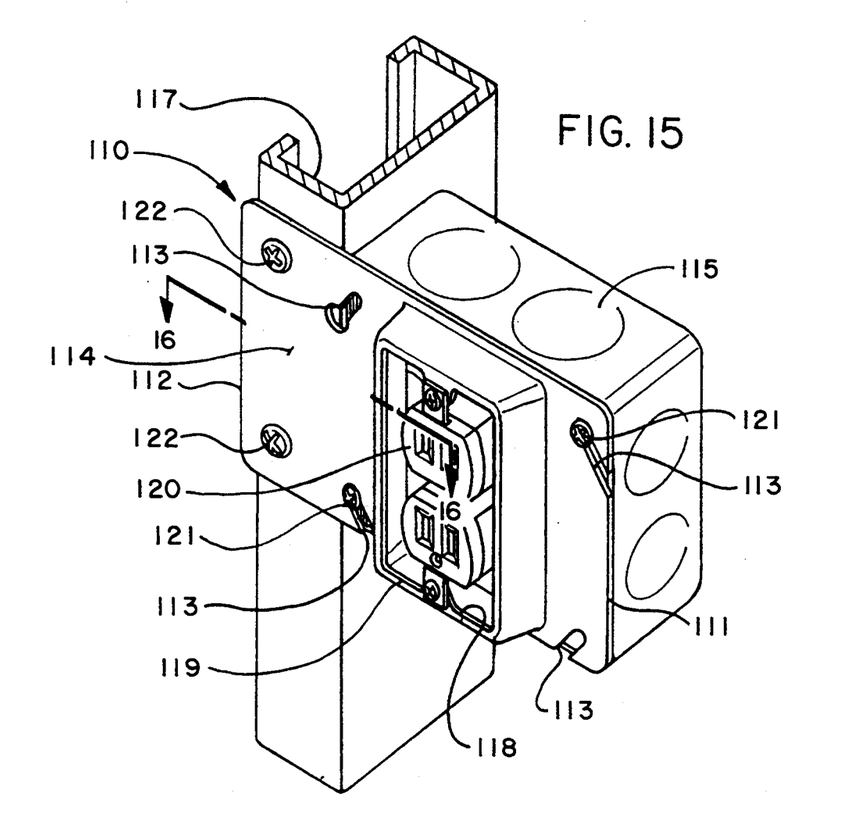
FIG. 15 is a pictorial view of the present invention showing the electrical outlet box connected to the unitary plate and the unitary plate connected to the metal stud such that the electrical outlet box abuts the stud.
Figure 16:
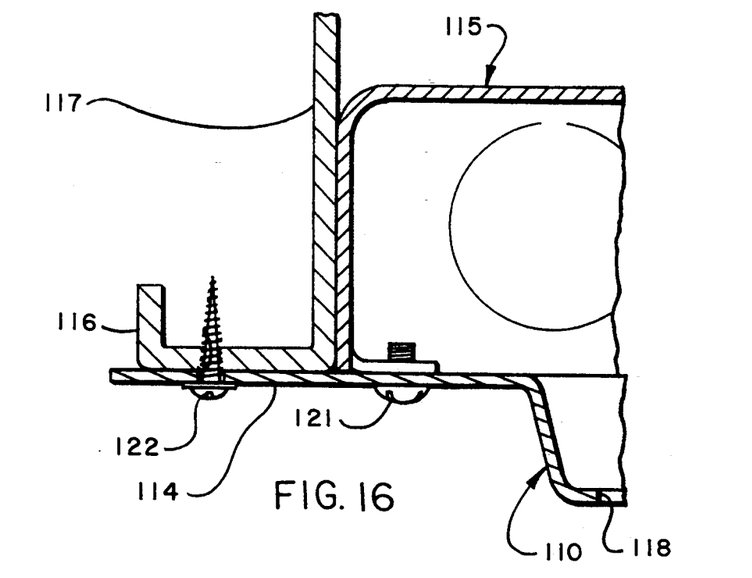
FIG. 16 is a cross-sectional view taken across the lines 16—16 of FIG. 15.

Not shown in FIGS. 1–6 is the raised cover ring 18 which is included in the installation. The raised cover ring 18 is a separate member which is planar and is attached to the bracket 11 and to the electrical outlet box 10 on the opposite side of the bracket 11. The raised cover ring 18 has a cut out portion 19 to communicate with and provide access to the electrical fixture (not shown) which is contained within the electrical outlet box 10. A raised rib 19 is circumferentially formed about the cut out portion of the raised cover ring 18. The height of the raised rib 19 portion is approximately equal to the thickness of the wall 15 in which the assembly is mounted. In this manner, when the electrical outlet box 10, the bracket 11 and the raised cover ring 18 are completely assembled and mounted and covered by the wall 15, the front surface of the raised cover ring 18 is in the plane of the outer surface of the wall 15 and is substantially flush with the wall 15. A typical raised cover ring 18 is shown in FIG. 7 (corresponding to FIG. 1A of U.S. Pat. No. 4,603,789). Typical outlet boxes, box supports and raised cover rings are available from suppliers such as Raco, Inc. and Caddy Corp. It is noted that the leg 14 of the bracket 11 has two bends 21 formed therein. The bends 21 are on both sides of the cut out portion of the box support bracket 11. The purpose of the bends 21 is to have the cutout portion of the bracket 11 in a plane set back from the plane of the front face of the bracket 11. In this manner, the raised cover ring 18 may be attached to the front face of the bracket 11 such that the face of the raised cover ring 18 is substantially in the plane of the front face of the bracket 11. The depth of the bends 21 is approximately equal to the thickness of the raised cover ring 18. As a consequence of having the bends 21, the positioning of the connected electrical outlet box 10 is limited and the electrical outlet box 10 is prevented from being abutted to the side wall of the stud 12. The size of the electrical outlet box, the cut out portion of the bracket and the cut out portion of the raised cover ring are all selected for the particular installation. The assembly can be used with one, two or more electrical fixtures in the electrical connector box or one or more electrical connector boxes may be mounted in close proximity to one another.

In the prior art assemblies (FIGS. 8–14), the worker must assemble and connect the three components, i.e., the electrical outlet box 10, the box support bracket 11 and the raised cover ring 18. If one or more is unavailable at the time, or of the incorrect size, there is a loss of time to obtain the missing component. Further, there is a cost factor for the three components. In addition, the assembling of the components is labor intensive. Also, in those embodiments having a far side box support, the worker must adjust the extension plate or must bend the far side box support to the desired length. This is further complicated by the need to provide boxes of differing depths (2 ½, 4, 6 or 8 inch) on the same job site. These steps are difficult because of the limited space available to perform the work and are time consuming.

The present invention, as shown in FIGS. 15–23, overcomes these shortcomings. A single unitary plate 110 or box support raised cover ring, is formed from a rigid material such as sheet metal or plastic (preferably at least ⅛ inch thick). Preferably, the unitary plate 110 is rectangular with a first side edge 111 and an opposite second side edge 112. A plurality of spaced-apart openings 113 are formed in the box support cover ring 110, there preferably being four openings 113, two openings 113 near the first side edge 111 and two openings spaced a short distance from the second side edge 112. The portion of the plate 110 between the latter openings 113 and the second side edge 112 is defined as a flange 114. The openings 113 preferably are elongated for adjustable connection of the box support cover ring 110 with an electrical outlet box 115 as will be described. Also formed in the flange 114 on the box support cover ring 110, are at least two spaced-apart holes 116 which are for connection of the box support cover ring 110 with a stud 117 in a wall W as will be described. The box support cover ring 110 also has a cut out portion 118 formed therein. Preferably the cut out portion 118 is disposed closer to the first side edge 111 of the box support cover ring 110 than to the second side edge 112 and is between the openings 113. In this manner, the cut out portion 118 does not extend onto the flange 114. A raised rib 119 is formed about the circumference of the cut out portion 118. The rib 119 has a height which is approximately equal to the thickness of the wall W as will be described.

The electrical outlet box 115 contains therein at least one electrical fixture 120 such as a convenience outlet, an electrical switch, electrical terminals etc. As shown in FIGS. 18–23, the electrical outlet box 115 is connected to the box support cover ring 110 by a plurality of fastening means 121. The fastening means 121 may be threaded screws, nuts and bolts or other commonly used fasteners. One fastening means 121 is received in each of the plurality of openings 113 in the box support cover ring 110. The box support cover ring 110 is adjusted on the electrical outlet box 115 by moving the plate 110 with respect to the elongated openings 113. The fastening means 121 are tightened and the box support cover ring 110 is secured to the outlet box 115. The box support cover ring 110 with the attached outlet box 115 is placed adjacent to the stud 117 such that the outlet box 115 abuts solidly against the side wall of the stud 117 and the flange 114 is disposed against the front face of the stud 117. At least two securing means 122 are disposed in the holes 116 in the flange 114 with one securing means 122 being received in each hole 116. The securing means 122 may be any common securing means such as a wood screw or a nail if the stud 117 is wood or, if the stud 117 is metal, the securing means 122 may be a self-tapping metal screw, a rivet, a nut and bolt,etc. Tightening the securing means 122 assures the disposition of the box support cover ring 110 and attached outlet box 115 to the stud 117 such that movement in any direction is prevented.

The box support cover ring 110/outlet box 115 assembly is covered by the wall W such that an opening in the wall W receives the raised rib 119 of the box support cover ring 110. The upper surface of the rib 119 is substantially flush with the outer surface of the wall W due to the height of the rib 119 being approximately the same as the thickness of the wall W. Thus, the electrical fixture 120 within the outlet box 115 is readily accessible to a user.

In this manner, the outlet box 115 with the electrical fixture 120 therein is firmly mounted between the covering front wall W and a back wall. Movement of the outlet box 115 in any direction is prevented by several factors peculiar to the present invention. The disposition of the electrical outlet box 115 solidly abutting the side wall of the stud 117 severely limits any horizontal or angular movement with respect to the stud 117. Further, any deflectional movement with respect to the stud 117 is limited. This limitation of horizontal, angular and deflectional movement is further reinforced by securing the extending flange 114 to the front face of the stud 117. In addition, vertical movement with respect to the stud 117 is prevented by the securing of the flange 114 to the front face of the stud 117. Further limitation of movement of the outlet box 115/box support cover ring 110 assembly is provided by the covering wall W.

Thus, the assembly of the present invention achieves solid installation without the need for a supporting arm between the front wall and the rear wall of a building structure and without the need for an L-shaped bracket to be attached to the stud on the side opposite from the outlet box. In addition, the present invention has only one box support cover ring 110 which serves the function of a box support and a raised cover ring, thereby providing cost efficiency by reducing the number of parts and the labor time to assemble and install as compared to the prior art. The present invention may be rapidly and economically assembled at the job site or it may be preassembled and brought to the job site. The preassembly is possible because there is no need to adjust the length of a far side box support for each electrical outlet box as in the prior art. It is estimated that use of the present invention could provide cost savings of approximately $0.75 per outlet box. In a commercial installation including a thousand or more electrical boxes, the savings could be substantial and for an electrical contractor could be a significant factor in the award of a contract.

Figure 17:
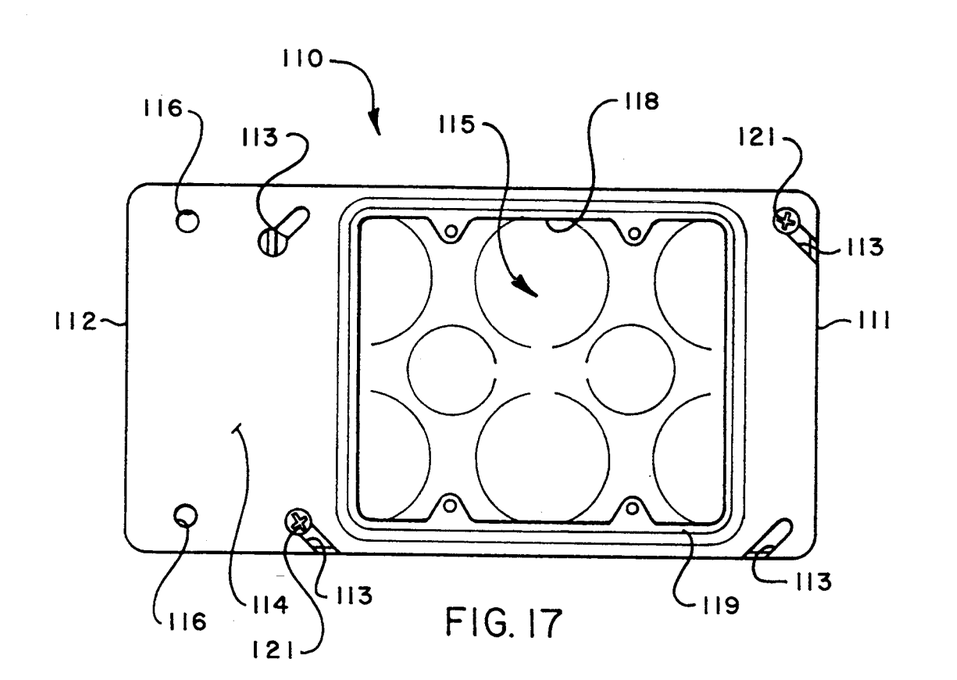
FIG. 17 is a front elevational view of the unitary plate of the present invention showing a plate usable with two ganged electrical fixtures.
Figure 18:
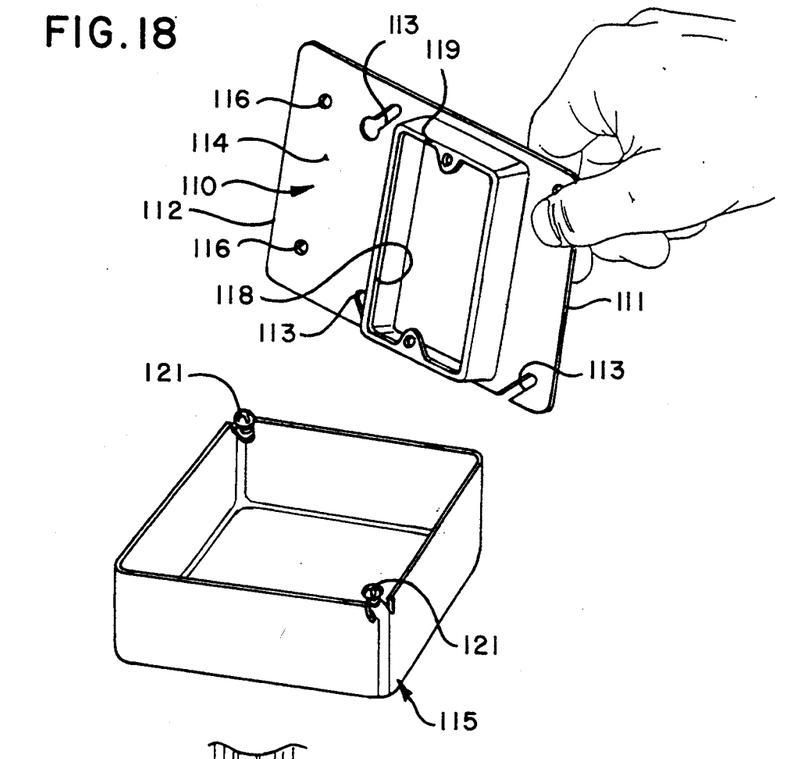
FIG. 18 is a pictorial view of a worker gathering the components of the present invention.
Figure 19:
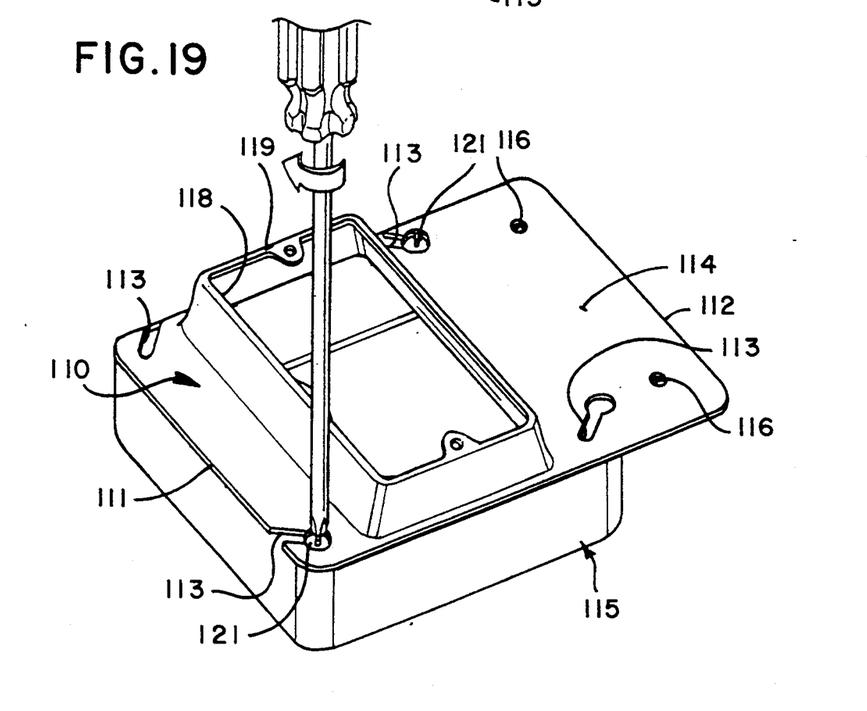
FIG. 19 is a pictorial view of the worker of FIG. 18 assembling the electrical outlet box and the plate.
Figure 20:
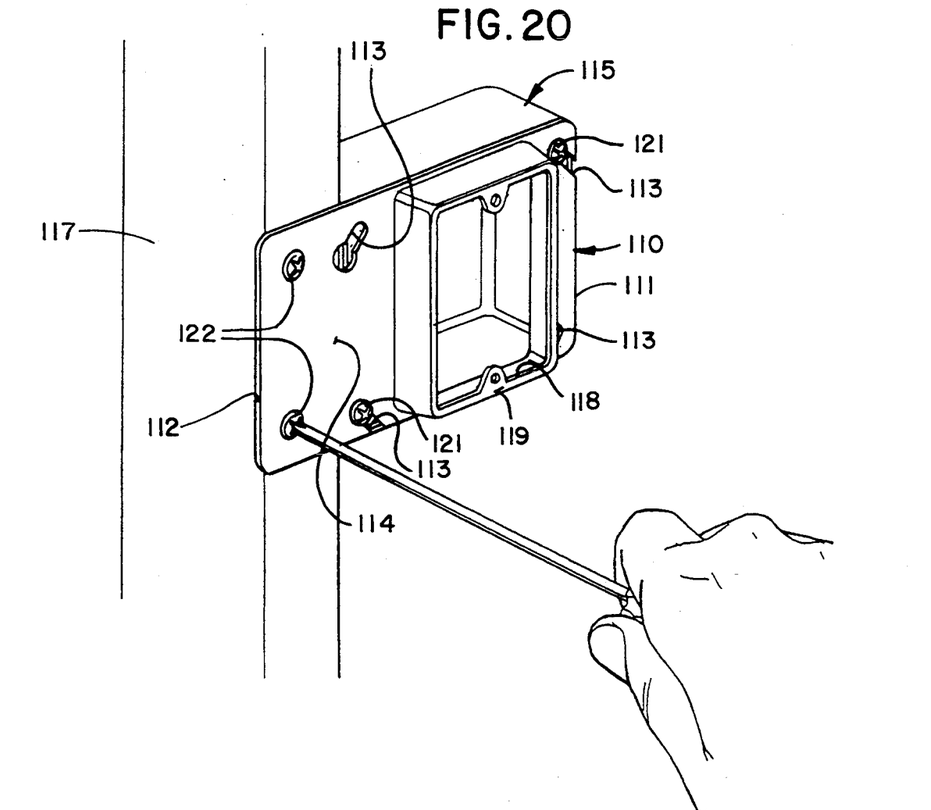
FIG. 20 is a pictorial view of the worker of FIG. 18 mounting the assembly of the present invention in the wall.
Figure 21:
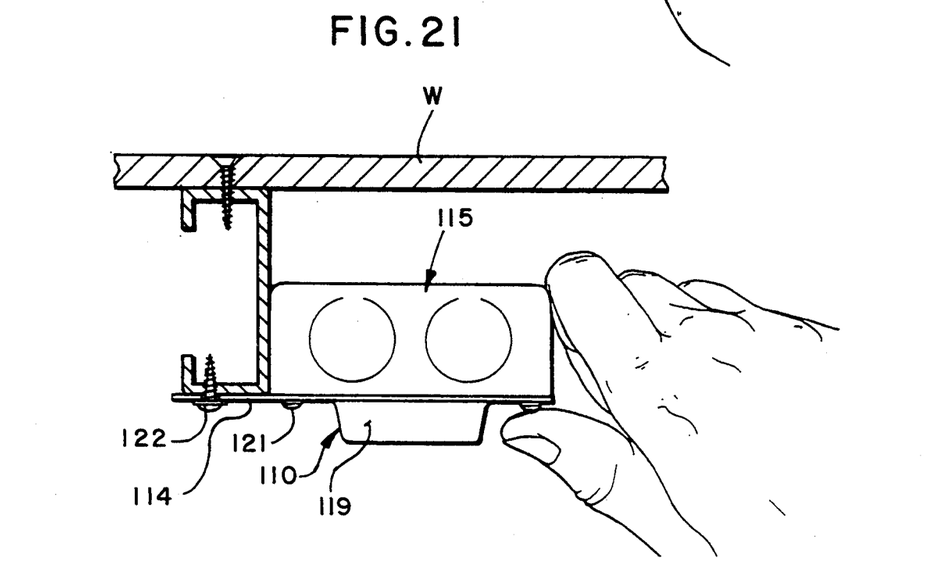
FIG. 21 is a top plan view of the present invention installed in the wall adjacent to one side of a metal stud and showing no movement.
Figure 22:
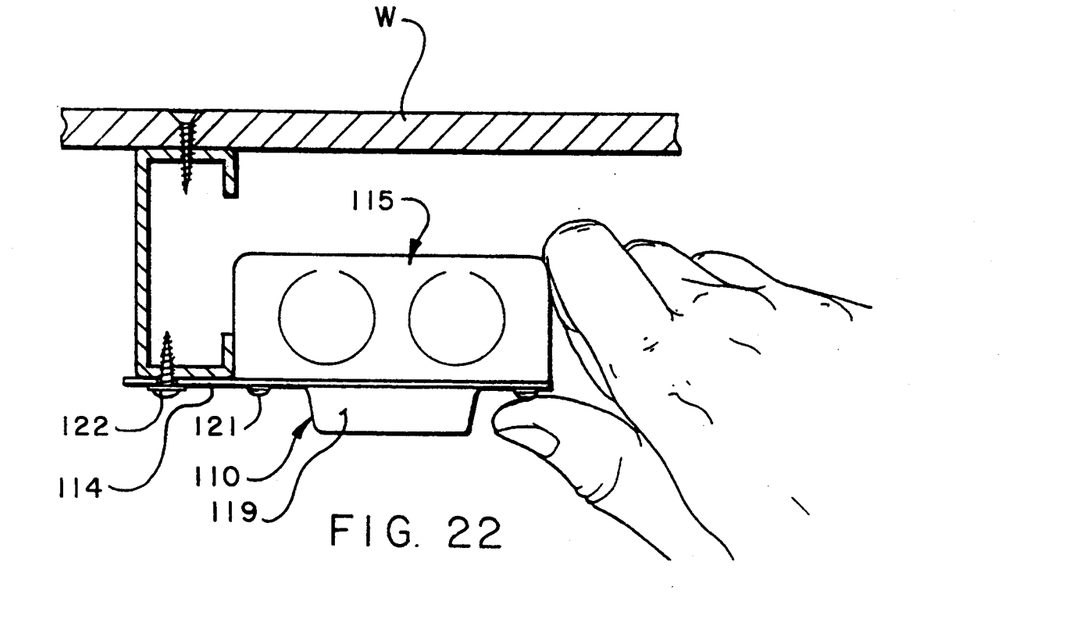
FIG. 22 is a top plan view of the present invention installed in the wall adjacent to another side of a metal stud and showing no movement.
Figure 23:
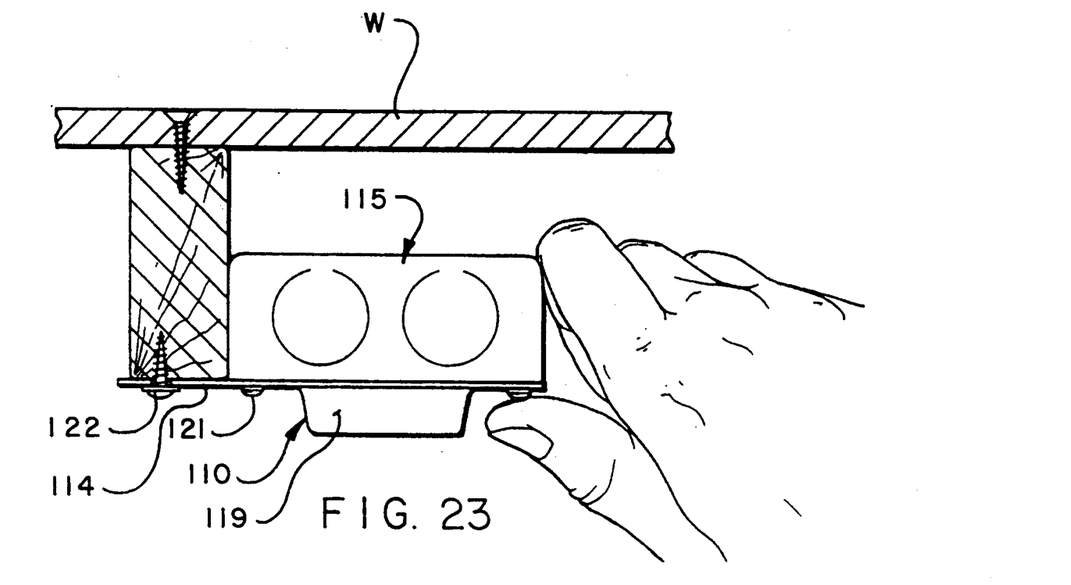
FIG. 23 is a top plan view of the present invention installed in the wall adjacent to a wooden stud and showing no movement.

The box support cover ring 110 of the present invention may be formed in a variety of sizes having any desired size of cut out portion 118 to permit the use of more than one fixture 120 within the electrical outlet box 115 (FIG. 17). The use of ganged fixtures 120 is possible. Also, the present invention may be used on either side of the stud 117 and may be used with U-shaped metal studs 117.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In an electrical outlet box mounted on a stud between a front wall and a rear wall of a building structure, wherein the stud has a side wall and further has a front face covered by the front wall of the building structure, and wherein the electrical outlet box normally has a separate box support and a raised cover ring secured thereto, the separate box support normally being secured to the stud such that the electrical outlet box is spaced from the side wall of the stud, thereby causing undesired deflection of the electrical outlet box between the front wall and the rear all, an improvement comprising a single unitary member serving the dual function of the raised cover ring and the box support, means for securing the single unitary member to the electrical outlet box, the single unitary member including a planar flange extending laterally therefrom and disposed over the front face of the stud, said planar flange lying in the same plane as said means for securing, and means for securing the flange to the front face of the stud, such that the electrical outlet box abuts solidly against the side wall of the stud and is prevented from undesired deflection, and such that the necessity for a special far side box support between the electrical outlet box and the rear wall of the building structure is completely obviated.

2. The improvement of claim 1, wherein the means for securing the single unitary member to the electrical outlet box comprises the single unitary member having a plurality of spaced-apart openings formed therein, a corresponding plurality of fastening means, one of the fastening means being received in each opening, the fastening means securing the single unitary member to the electrical outlet box.

3. The improvement of claim 1, wherein the means for securing the flange to the front face of the stud comprises the flange having at least two holes formed therein, at least two securing means, one of the securing means being received in each hole, the at least two securing means being connected to the stud.

4. A box support assembly for an electrical outlet box, the electrical outlet box being mounted on a stud in a wall, the stud having a side wall and a front face, the electrical outlet box capable of containing therein at least one electrical fixture, the assembly being covered by a wall, the assembly comprising:

a rigid unitary plate disposed over the electrical outlet box, the plate having a plurality of spaced-apart openings formed therein, a corresponding plurality of fastening means, one of the fastening means being received in each opening, the fastening means connecting the plate to the electrical outlet box, the plate having a cut-out portion, the cut-out portion communicating with and providing access to the at least one electrical fixture within the electrical outlet box, a raised rib circumferentially formed about the cut-out portion, the raised rib having a height corresponding with a thickness of the wall covering the assembly, the plate having a planar flange portion having, an edge, extending laterally therefrom, said planar flange portion lying in the same plane as said spaced apart openings, the said planar flange portion further having at least two holes formed therein near the edge thereof, at least two securing means, one of the securing means being received in each hole, the at least two securing means being connected to the front face of the stud, thereby connecting the plate, and the electrical outlet box connected thereto, to the stud, wherein the connected electrical box abuts the sidewall of the stud and is secured thereto preventing movement in any direction, of the assembly and the connected electrical box.

5. The assembly of claim 4, wherein the unitary plate is rectangular, having a first edge and an opposite second edge, the cut out portion being disposed closer to the first edge than to the second edge, the at least two holes being formed near the second edge thereof.

6. The assembly of claim 4, further comprising a raised rib circumferentially formed about the cut-out portion, the raised rib having a height corresponding with a thickness of the wall covering the assembly, an opening being formed in the wall receiving therein the raised rib about the cut out portion, wherein access is provided to the at least one electrical fixture and movement of the assembly and electrical circuit box are further limited by the wall covering the assembly.

7. A method of mounting an electrical outlet box on a stud between a rear wall and a front wall of a building structure, the stud having a front face and a side wall, the method comprising the steps of:

providing a unitary member serving the dual function of a raised cover ring and a box support, said member having means for securing said member to an electrical outlet box, having a planar flange extending laterally therefrom and lying in the same plane as said means for securing, securing the unitary member to the electrical outlet box, wherein the planar flange extends laterally from the electrical outlet box, disposing the planar flange over the front face of the stud, wherein the electrical outlet box solidly abuts the sidewall of the stud, securing the planar flange to the front face of the stud wherein the electrical outlet box is prevented from undesired movement in any direction.

* * * * *